United States Patent [19]

DeStephanis

[11] 4,113,262
[45] Sep. 12, 1978

[54] RECORD SUPPORT AND ALIGNMENT APPARATUS FOR A VIDEO DISC PLAYER

[75] Inventor: Ralph DeStephanis, Middlesex, N.J.

[73] Assignee: RCA Corporation, New York, N.Y.

[21] Appl. No.: 801,728

[22] Filed: May 31, 1977

[30] Foreign Application Priority Data

Dec. 20, 1976 [GB] United Kingdom ............... 53175/76

[51] Int. Cl.² ........................................... G11B 25/04
[52] U.S. Cl. ..................................... 274/9 B; 360/97
[58] Field of Search ................. 358/128; 179/100.4 R; 360/133, 97; 274/9, 1 R

[56] References Cited

U.S. PATENT DOCUMENTS

| 3,377,072 | 4/1968 | Gentilini | 274/9 B X |
| 3,823,948 | 7/1974 | Jenkins | 274/9 B |
| 3,899,181 | 8/1975 | Dannert | 274/1 R |
| 3,941,391 | 3/1976 | Ohmiya | 274/9 B |

*Primary Examiner*—Harry N. Haroian
*Attorney, Agent, or Firm*—Eugene M. Whitacre; Joseph S. Tripoli; Dilip A. Kulkarni

[57] ABSTRACT

A record support and alignment apparatus comprises a set of lifting pads secured to a depressible platform mounted in a video disc player. The lifting pads are adapted for motion between a withdrawn position and an extended position with respect to the platform. The lifting pads, in the withdrawn position, allow a record jacket to be fully inserted into the player. The lifting pads, in the extended position, support a record retained in the player such that, while the platform is disposed in an elevated position, the retained record is aligned with an empty jacket during its insertion in the player, whereby reversion of a retained record to an empty jacket is facilitated. Withdrawal of the jacket, after its full insertion in the player, removes the enclosed record from the player.

9 Claims, 29 Drawing Figures

RECORD SUPPORT AND ALIGNMENT APPARATUS FOR A VIDEO DISC PLAYER

The present invention is generally related to a video disc player. More particularly, this invention is suitable for use in a handling system which permits insertion of a video disc into the player, and its extraction therefrom, without direct handling of the disc by the consumer.

In U.S. Pat. No. 3,842,194, issued to Jon K. Clemens, a video disc system is disclosed. In an arrangement therein disclosed, an information track consists of geometric variations in the bottom of a smooth spiral groove on the surface of a disc record. The disc record has a deposit of dielectric material overlying a coating of conductive material. During playback, variations in the capacitance formed between an electrode incorporated in a groove-riding stylus and the conductive coating of the disc record are sensed as it is rotated by a supporting turntable to reconstruct the recorded information.

In the systems of the Clemens type, in order to obtain adequate playing time, the successive groove convolutions are relatively closely spaced on the surface of the video disc (e.g., 4.5 micrometers corresponding to a groove density of 5,555 gpi) and the signal elements in the groove bottom are relatively small (e.g., signal element length — 0.3 to 0.8 micrometers and signal element depth of 0.10 to 0.15 micrometers).

The accumulation of dust on such video discs presents a problem. The problem of dust accumulation is aggravated when the exposure of a video disc to atmospheric dust is accompanied by the condition of high temperature and high humidity. It is therefore advantageous to provide a cover which completely encloses the video disc in a dust-proof environment during its storage and handling.

The video discs of the type described above are prone to damage during their manual handling (e.g., scratches, fingerprints, etc.). It is therefore desirable to provide a system which permits insertion and withdrawal of a video disc into and from a player without its direct handling by the user.

Systems for inserting and extracting a video disc into and from a player without its direct handling by the consumer are described in (1) U.S. patent application, Ser. No. 747,865, entitled "VIDEO DISC HANDLING SYSTEM FOR A VIDEO DISC PLAYER," filed for M. A. Leedom, and (2) U.S. patent application, Ser. No. 747,729, entitled "VIDEO DISC INSERTION/EXTRACTION SYSTEM FOR A VIDEO DISC PLAYER," filed for C. F. Coleman. Both Leedom and Coleman applications are assigned of record to the assignee of the instant application.

In systems of the type illustrated in the Leedom and Coleman applications, an empty package is inserted through an input slot in the player in order to remove a disc record retained in the player. The improvement of the operation of the systems of the Leedom and Coleman type is attained by aligning a retained record with an edge opening in an empty package prior to insertion of the package into the player to facilitate reversion of the retained record to its package during package insertion. Withdrawal of the package, after its full insertion into the player, removes the enclosed record from the player.

The record support and alignment device, pursuant to this invention, is suitable for use with a player for recovering prerecorded signals from a disc record removeably subject to occupancy of a protective cover. The player includes a housing having an input slot dimensioned to permit an insertion of a cover into the player and its removal therefrom. Guides are aligned with the input slot for facilitating the cover insertion and removal. A platform, mounted in the housing and disposed under the guides, is subject to motion between an elevated position and a depressed position. The novel record support and alignment device is secured to the platform. The record support and alignment device is subject to motion between a withdrawn position and an extended position relative to the platform. The record support and alignment device, in the withdrawn position, allows cover arrival at a fully inserted position in the player. The record support and alignment device in the extended position supports a record retained in the player such that, while the platform is in the elevated position, the retained record is aligned with an empty cover during its insertion into the player.

In accordance with a feature of the present invention, the record support and alignment device is caused to move from the extended position to the withdrawn position in response to cover insertion into the player. Pursuant to a still further feature of the present invention, the record support and alignment device is biased to occupy the extended position.

Figure 1:
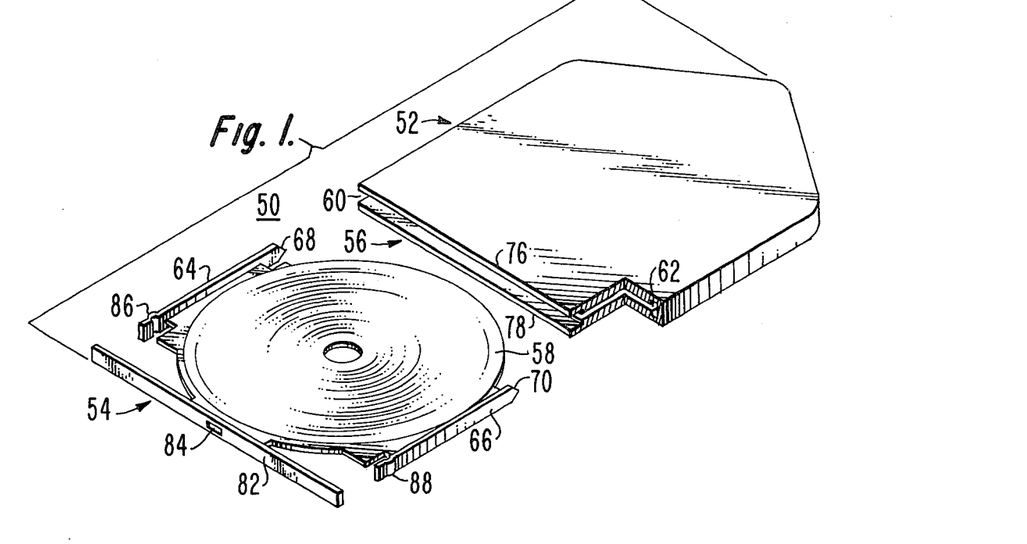
FIG. 1 is a perspective view of a protective cover comprising a jacket and a record retaining member removably located therein; the protective cover of FIG. 1 is suitable for use with a video disc system incorporating a record support and alignment device pursuant to the present invention.
Figure 2:
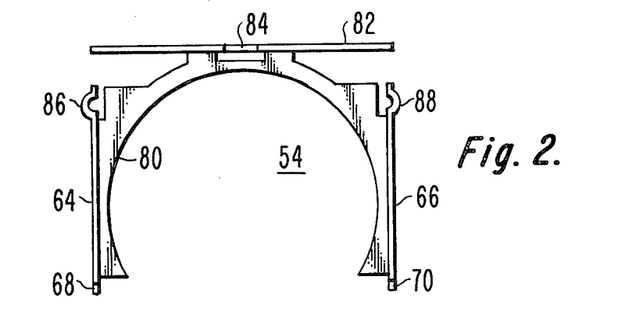
FIGS. 2 and 3 are the top views of the record retaining member and the jacket of FIG. 1.
Figure 3:
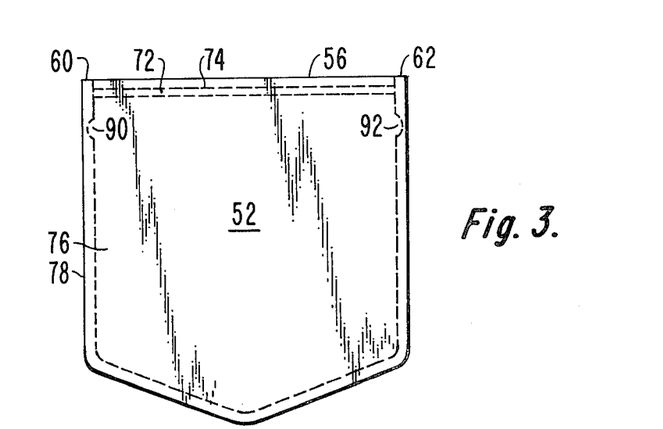

FIG. 1 is a perspective exploded view of a record protective cover 50 suitable for use with a video disc system described subsequently. As shown therein, the record cover comprises a sleeve-type jacket 52 and a record retaining tray 54. FIGS. 2 and 3 show, respectively, the top views of the tray and the jacket of FIG. 1. The jacket 52 has an end access opening 56 having dimensions permitting the tray 54, carrying a video disc 58, to slide freely therethrough. The protective cover is the subject of a copending U.S. application of L. A. Torrington, Ser. No. 801,603, entitled "VIDEO DISC PACKAGE" and filed concurrently herewith. The Torrington application is assigned of record to the assignee of the instant application.

The jacket 52 has a pair of channels 60 and 62 for receiving a pair of ribs 64 and 66 provided in the tray 54 in order to accurately locate the tray and the video disc 58 therein. The ribs 64 and 66 having wedge-shaped end portions 68 and 70 for leading the insertion of the tray 54 into the jacket 52.

As shown in FIG. 3, a pair of cleaning pads 72 and 74 made from suitable soft material (e.g., velvet) are secured to the interior surfaces of the panels 76 and 78 defining the jacket 52 to effect a wiping of a video disc during its insertion into and removal from the jacket. Other suitable materials for the wiping pads are (1) lintless, non-woven polyester paper made by Dupont, and (2) polyurethane foam made by Scott Paper Co., Foam Division.

The thickness of the tray 54 is about the same as the thickness of the bead of the video disc 58. As shown in FIG. 2, the tray 54 has a generally circular through opening 80 having a diameter slightly greater than the diameter of the video disc 58. The tray 54 allows access to both faces of the video disc 58 without requiring any alteration of the position of the video disc within the tray or the jacket 52. Both the tray 54 and the video disc 58 are supported within the jacket 52 by the interior surfaces of the panels 76 and 78.

When the tray 54 is fully inserted into the jacket 52, the front portion 82 of the tray extends into the access opening 56 and closes it to keep dust or other contaminants from entering into the video disc enclosing cavity of the jacket.

The front portion 82 of the tray 54 has a record extracting member receiving hole 84 which is accessible in a direction substantially parallel to the direction of the to-and-fro movement of the tray in the jacket 52.

As shown in FIGS. 2 and 3, the tray 54 includes a pair of detents 86 and 88 which are received in the depressions 90 and 92 provided in the jacket 52 when the tray is fully inserted into the jacket. The detents prevent inadvertent slippage of an enclosed video disc from the jacket.

Figure 4:
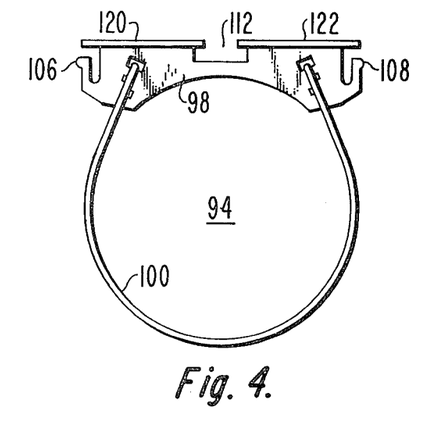
FIGS. 4 and 5 illustrate the top views of a modified record retaining member and a modified jacket.
Figure 5:
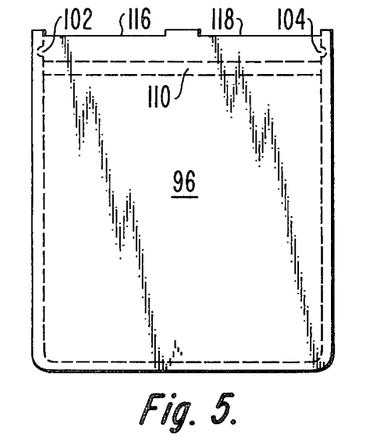

FIGS. 4 and 5 illustrate top views of a modified tray 94 and a modified jacket 96. As shown in FIG. 4, the modified tray 94 consists of a plastic spine portion 98 and an annular portion 100 defined by a wire form. The wire form is insert molded into the plastic spine portion.

Figure 4A:
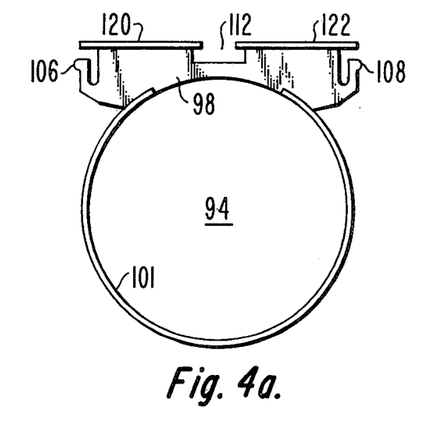
FIG. 4a shows another embodiment of the record retaining member suitable for use with the modified jacket of FIG. 5.

An alternate technique to the use of a wire form, is use of an extruded plastic tube. The ends of a plastic tube 101, may, for example, be glued to the spine portion 98 in order to define the annular portion as shown in FIG. 4a.

The jacket 96 has depressions 102 and 104 for receiving the detents 106 and 108 provided in the spine portion 98. A pair of soft wiping pads 110 are secured to the interior surfaces of the panels constituting the jacket 96 for cleaning the record during its insertion and removal. The spine portion 98 has a record extracting member receiving hole 112. The jacket 96 has wells 116 and 118 for receiving the end portions 120 and 122 of the spine portion 94.

Figure 6:
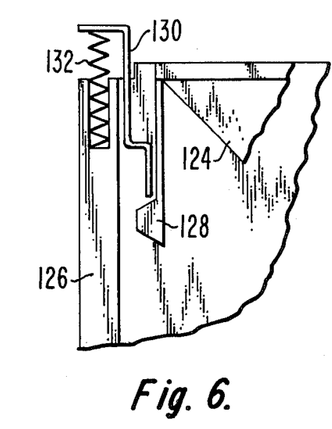
FIG. 6 shows a record retaining member release mechanism suitable for use in the protective cover of FIGS. 1–3 and FIGS. 4, 4a and 5.

Shown in FIG. 6 is an alternative technique for releasably securing a record retaining tray 124 to an enclosure 126. The top panel of the enclosure 126 is removed to expose the underlying details. The record retaining tray 124 has a detent member 128 which is disposed for cooperation with a member 130 slidably mounted within the enclosure for motion between an extended position, as shown in FIG. 6, and a depressed position (not shown). The slidable member 130, while in the extended position, precludes a removal of the tray 124 from the enclosure 126. The slidable member 130, while in the depressed position, causes the detent member 128 to retract permitting tray removal from the enclosure 126. A spring 132 is provided to bias the slidable member 130 to occupy the extended position. As explained subsequently, means are provided in the player to depress the slidable member 130 during cover arrival at a fully inserted position in the player to release the tray 124.

Figure 7:
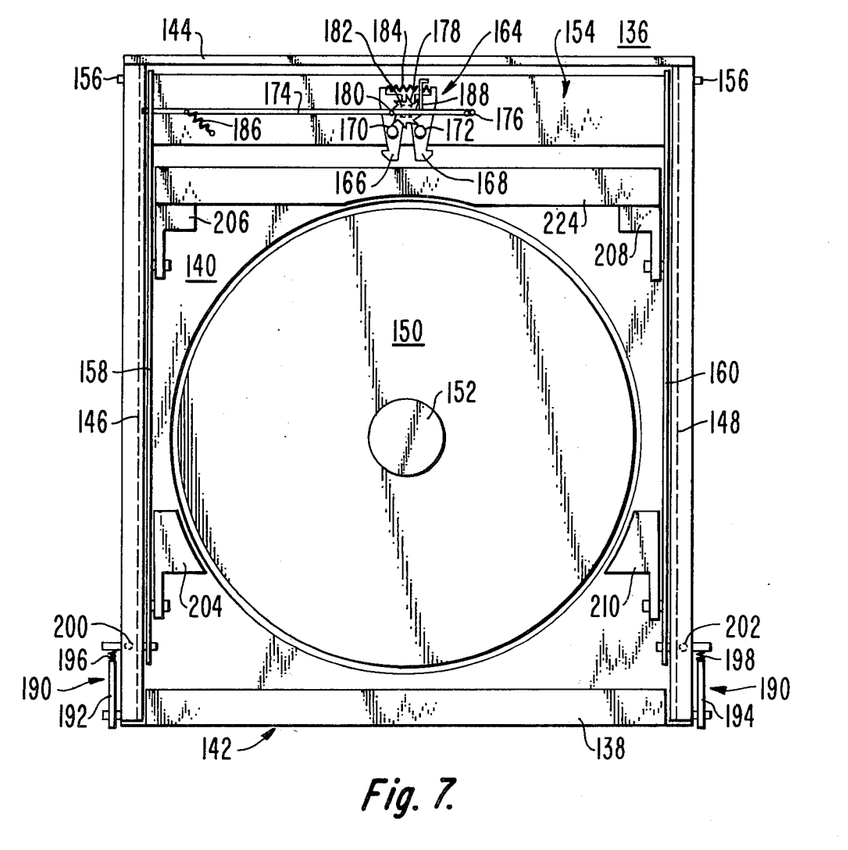
FIG. 7 represents the plan view of a video disc system incorporating the novel record support and alignment device.
Figure 8:
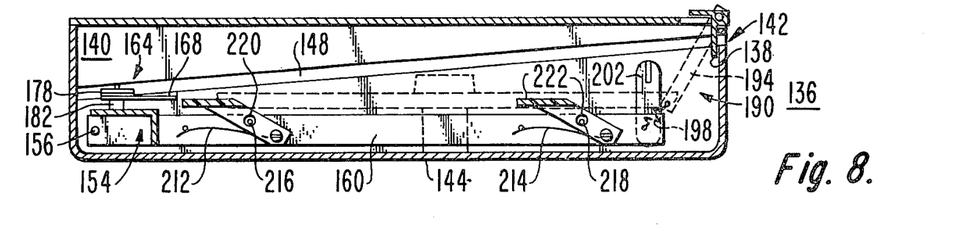
FIGS. 8 and 9 illustrate the side views of the video disc system of FIG. 7 including a movable platform shown, respectively, in a depressed position and an elevated position.
Figure 9:
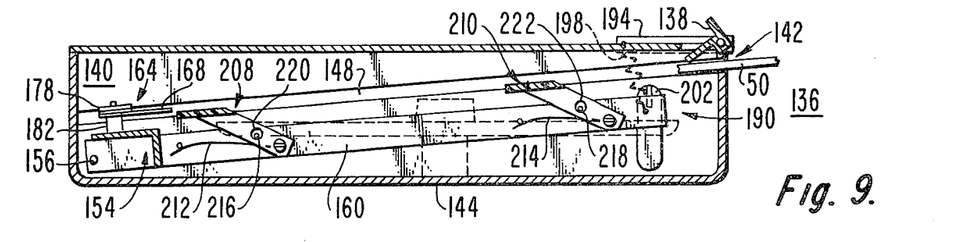

FIG. 7 is a plan view of a video disc player 136 of the variety described in the Clemens U.S. Pat. No. 3,842,194. The player in FIG. 7 is shown with its lid removed. FIGS. 8 and 9 are sectional views of the video disc player of FIG. 7 along the center line thereof while a dust excluding flap 138 is disposed, respectively, in a closed position and an open position.

The player has a pollution free chamber 140 into which the record cover 50 is inserted through an input slot 142. The input slot 142 has dimensions which permit the record cover to slide therethrough without hindrance. The dust excluding flap 138 is pivotally mounted to the player housing 144 for motion between the closed position denying access to the chamber 140 (FIG. 8), and the open position permitting access to the chamber (FIG. 9). The flap 138 serves to keep the chamber 140 from being contaminated by dust or other foreign matter.

The player housing 144 is provided with a pair of channels 146 and 148 for guiding the insertion and removal of the record cover into and from the player. The channels 146 and 148 are disposed at an angle relative to the player housing 144 such that they are aligned with the input slot 142 at the front end of the player.

The video disc player further includes a turntable 150 for rotatably supporting a video disc during playback. The turntable 150 has a central spindle 152 subject to reception in the centering aperture of the video disc. A stylus arm carriage carrying a signal pickup device is not shown for the sake of clarity. The stylus arm carriage traverses the signal pickup across a turntable mounted video disc during playback.

A platform 154 is pivotally mounted about a rod 156 for motion between a depressed position (FIG. 8) and an elevated position (FIG. 9). The platform 154 comprises a pair of side rails 158 and 160 joined by a cross member 162 at the rear end of the player 136.

Figure 10:
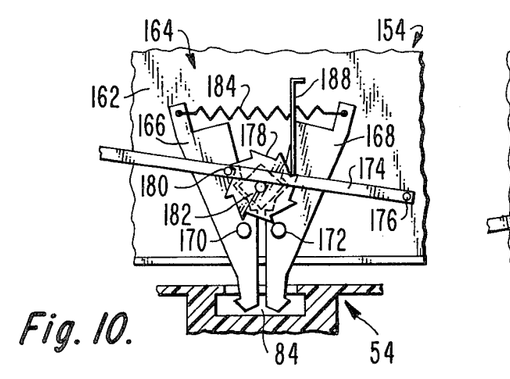
FIGS. 10 and 11 show a record extracting mechanism disposed, respectively, in a retracted condition and a deployed condition; the record extracting mechanism of FIGS. 10–11 is suitable for use with the video disc system of FIGS. 7 and 12.
Figure 11:
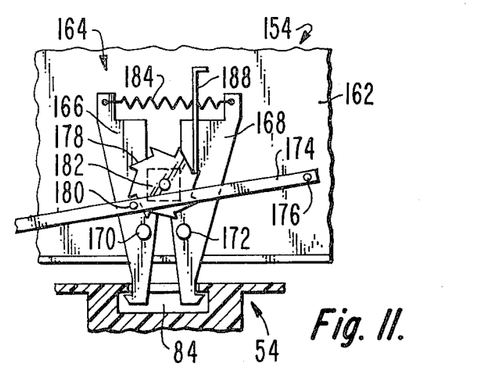

As shown in FIGS. 7, 10 and 11, a record extracting mechanism 164, having a pair of latch arms 166 and 168 which are pivoted around pins 170 and 172, is mounted at the rear end of the player 136 on the cross member 162. As can be seen from FIG. 9, the latch arms 166 and 168 are aligned with the center line of the channels 146 and 148 when the platform 154 is occupying the elevated position. The latch arms 166 and 168 are admitted into the hole 84 provided in the tray 54 when the record cover 50 is fully inserted into the player 136.

The record extracting mechanism 164 includes a paddle arm 174 pivoted about a pin 176 mounted on the cross member 162. The paddle arm 174 is rotated clockwise through an arc when the record cover is fully inserted into the player. The clockwise rotation of the paddle arm 174 causes a ratchet wheel 178, rotatably mounted on the cross member 162, to advance by one tooth, also in a clockwise direction, via a retractable pin 180 mounted on the paddle arm. Such rotation of the ratchet wheel 178 causes a square-shaped cam 182, disposed between the latch arms 166 and 168 and secured to the ratchet wheel, to advance by one step (e.g., 45°) in a clockwise direction. Such advancement of the square-shaped cam 182 causes the latch arms 166 and 168 to alternate between an extended condition (FIG. 10) and a retracted condition (FIG. 11). A spring 184 interconnects the rear ends of the latch arms 166 and 168 in order to assure continuous engagement between the latch arms and the cam 182.

When the record cover is withdrawn from the player 136, a spring 186 causes the paddle arm 174 to return to its home position shown in FIGS. 7 and 10. The record extracting mechanism 164 includes a pawl 188 for preventing a reversal of the motion of the ratchet wheel 178 as the paddle arm 174 returns to its home position. It can be seen from FIGS. 7, 10 and 11 that although the pawl 188 prevents a motion of the ratchet wheel 178 in the reverse (anticlockwise) direction, it allows the forward motion (clockwise) of the ratchet wheel. The pin 180 is made retractable in order to allow the paddle arm 174 to return to its home position without requiring the ratchet wheel 178 to rotate in the reverse direction.

Thus each time the record cover is fully inserted into the player 136, the condition of the latch arms 166 and 168 is alternated between the extended condition (FIG. 11) and the retracted condition (FIG. 10). The alternating apparatus is the subject of a copending U.S. application of C. A. Elliott, et al., Ser. No. 801,602 entitled "PACKAGE ACTUATED RECORD EXTRACTING MECHANISM FOR A VIDEO DISC PLAYER" and filed concurrently herewith. The Elliott, et al. application is assigned of record to the assignee of the instant application. The function of the record extracting mechanism 164 will be explained in detail subsequently.

The player 136 further includes platform linkage assembly 190 for causing the motion of the platform 154 between the depressed position (FIG. 8) and the elevated position (FIG. 9) in response to motion of the flapper door 138, respectively, between the access denying position (FIG. 8) and the access permitting position (FIG. 9). The platform linkage assembly 190 includes a pair of levers 192 and 194 secured to the door 138 for rotation therewith. The platform linkage assembly 190 further includes a pair of springs 196 and 198 interconnecting the free ends of the levers 192 and 194 and the side rails 158 and 160. A pair of stop pins 200 and 202 are mounted to the player housing 144 for ensuring that the platform 154 is raised to a correct height when the flapper door 138 is opened, as a result of the insertion of the record cover into the player 136, in the manner shown in FIG. 9. The springs 196 and 198 allow the flapper door 138 to over-travel when the record cover is fully inserted into the player so that the platform 154 rises to the correct height without the need for precision parts.

A set of spring loaded lifting pads 204–210 are pivotally mounted to the rails 158 and 160 for a purpose which will be described subsequently. A set of wire springs (e.g., 212 and 214) are provided to bias the lifting pads (e.g., 208 and 210) toward a raised position as shown in FIGS. 8 and 9. A set of pins (e.g., 216 and 218) are secured to the rails (e.g., 160) for reception in apertures (e.g., 220 and 222) provided in the lifting pads (e.g., 208 and 210) so as to accurately locate the top surfaces of the lifting pads relative to the platform 154 (FIGS. 8 and 9). A member 224 (FIG. 7) interconnects the rear lifting pads 206 and 208.

The operation of the system will now be described in conjunction with FIGS. 7–11. When the record cover, carrying a video disc, is inserted into the player 136 through the input slot 142, it lifts the flapper door 138, whereby the platform 154 is caused to rise as shown in FIG. 9. The insertion of the record cover into the player 136 causes the lifting pads 204–210 to retract within the confines of the platform 154, allowing the record cover to arrive at a fully inserted position in the player. As the record cover arrives at the fully inserted position in the player 136, the latch arms 166 and 168 are admitted into the hole 84 of the tray 54 (FIG. 10).

The arrival of the record cover at the fully inserted position in the player 136 causes the latch arms 166 and 168 to change from the retracted condition (FIG. 10) to the extended condition (FIG. 11), thereby locking the tray 54 to the platform 154. As the enclosure 52 is withdrawn thereafter (1) the latch arms 166 and 168 retain the tray 54, carrying the video disc 58, in the player and (2) the wire springs (e.g., 212 and 214) cause the lifting pads 204–210 to return to the desired raised position. Thus, the tray 54 and the video disc 58 are retained in the player 136 resting on the lifting pads 204–210 at an appropriate level (i.e., having their center lines aligned with the center lines of the channels 146 and 148) upon a conclusion of enclosure withdrawal.

Additionally, enclosure withdrawal from the player 136 allows the flapper door 138 to move to the access denying position shown in FIG. 8. Such motion of the flapper door 138 causes the platform 154 to move to the depressed position, as shown in FIG. 8, effecting a transfer of the video disc 58 from the lifting pads 204–210 to the turntable 150 for playback.

When an empty jacket is inserted into the player 136 through the input slot 142 (FIG. 9), the flapper door 138 is opened causing the platform 154 to rise to the elevated position (FIG. 9). As the platform 154 rises, the lifting pads 204–210 lift the tray 54 and the video disc 58 therewith.

When the platform 154 reaches the elevated position (FIG. 9), the lifting pads 204–210 support the tray 54 and the video disc 58 so that their center lines are aligned with the center line of the empty jacket 52, causing the tray and the video disc to return to the jacket during its insertion. When the jacket 52 is fully inserted into the player 136, it causes the latch arms 166 and 168 to change from the extended condition (FIG. 11) to the retracted condition (FIG. 10) releasing the tray 54. When the jacket 52 is removed from the player 136, detents 86 and 88 (FIG. 2) cause the enclosed tray 54 and the video disc 58 to leave the player.

Thus, it will be seen that the above-described system allows a video disc to be inserted into and removed from the player without its direct handling by the consumer.

An additional advantage of this system is that it prevents inadvertent insertion of a record containing cover into the player whenever a record is already present inside the player. This is due to the fact that the record retaining member in the record containing cover will interfere with the record present inside the player if such an attempt is made.

Such a record handling system is the subject of a copending U.S. application of L. A. Torrington, Ser. No. 801,604, entitled "RECORD HANDLING SYSTEM FOR A VIDEO DISC PLAYER" and concurrently filed herewith. The Torrington application is assigned of record to the assignee of the instant application.

Figure 12:
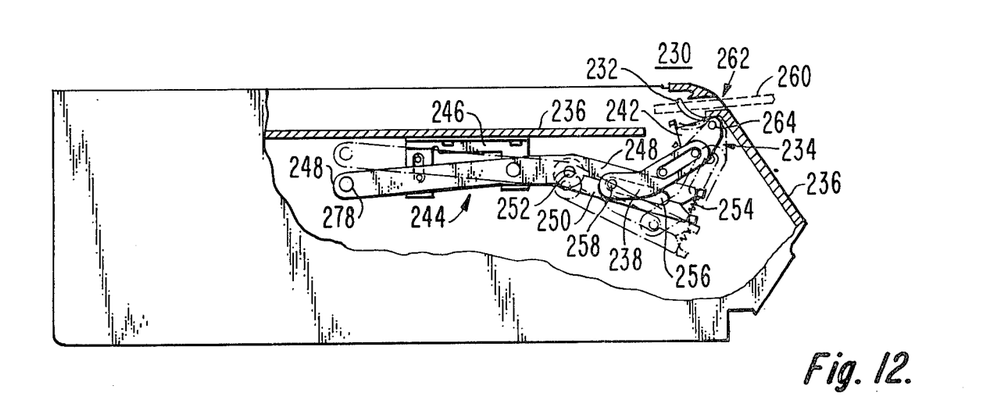
FIG. 12 shows a side view of a video disc system incorporating a second embodiment of the novel record support and alignment device pursuant to the principles of the present invention; the video disc system of FIG. 12 includes a modified platform lifting/lowering mechanism.

A second embodiment of the video disc player incorporating the principles of the present invention will now be explained in conjunction with FIGS. 12–26. FIG. 12 illustrates the side view of a modified video disc player 230. As shown therein, a flapper door 232 is secured to a bracket assembly 234 pivotally mounted to the player housing 236 by means of a pin 264.

Figure 13:
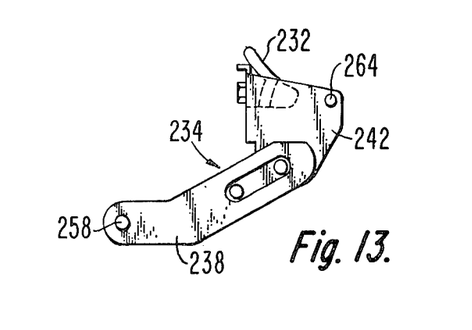
FIGS. 13, 14 and 15 respectively illustrate the end view, the front view and the plan view of a door bracket assembly suitable for use with the modified video disc system of FIG. 12.
Figure 14:
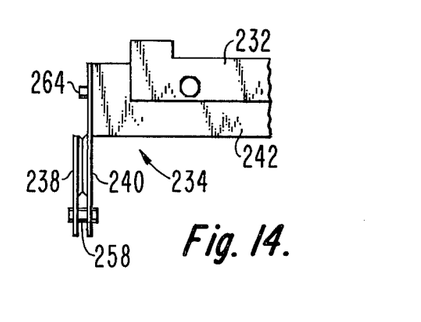
Figure 15:
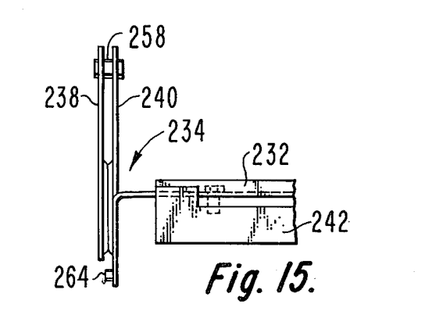

FIGS. 13, 14 and 15 illustrate the end view, the front view and the top view of the pivoted bracket assembly 234 which is mounted on the left hand side of the player 230. A similar bracket assembly is pivotally mounted on the right hand side of the player 230. The bracket assembly 234 includes a pair of plate members 238 and 240 secured to a door bracket member 242.

As shown in FIG. 12, a platform linkage assembly 244 is pivotally mounted to the player housing 236 by means of a support bracket 246.

Figure 16:
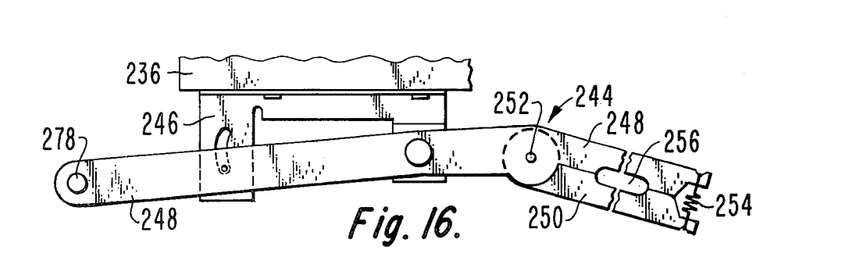
FIGS. 16 and 17 show, respectively, the side view and the plan view of a platform linkage assembly subject to cooperation with the door bracket assembly of FIGS. 13–15 and suitable for use in the modified video disc system of FIG. 12.
Figure 17:
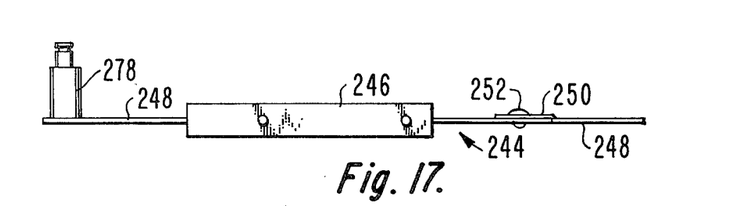

FIGS. 16 and 17 illustrate the end view and the top view of the platform linkage assembly 244 which is mounted on the left hand side of the player 230. A similar linkage assembly is provided on the right hand side of the player 230. The platform linkage assembly 244 includes levers 248 and 250 which are rotatably secured to each other by a rivet 252. The ends of the levers 248 and 250 are interconnected by a spring 254. The levers 248 and 250 define an elongated slot 256 in which a pin 258, secured to the plate members 238 and 240 as shown in FIGS. 13–15, is slidably received.

Figure 18:
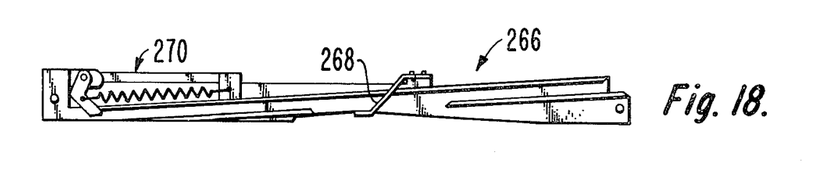
FIG. 18 illustrates means for guiding a record cover into the modified video disc system of FIG. 12; also shown in FIG. 18 is a cover ejecting mechanism.

When a record cover 260 is inserted into the modified player 230 through an input slot 262, the door bracket 242 is pivoted about the pin 264 causing the distal end of the lever 248 to rise. The player 230 includes a pair of rails aligned with the input slot 262 for facilitating cover insertion and removal. FIG. 18 shows a guiding rail 266 which is mounted on the right hand side of the player 230. A similar guiding rail is mounted on the left hand side of the player 230. A record hold down spring 268 is secured to the rail 266. Also shown in FIG. 18 is a cover ejecting mechanism 270. The cover ejecting mechanism 270 ejects the cover after the enclosed tray is released by the record extracting mechanism and ejects the jacket after the enclosed tray is gripped by the record extracting mechanism.

Figure 19:
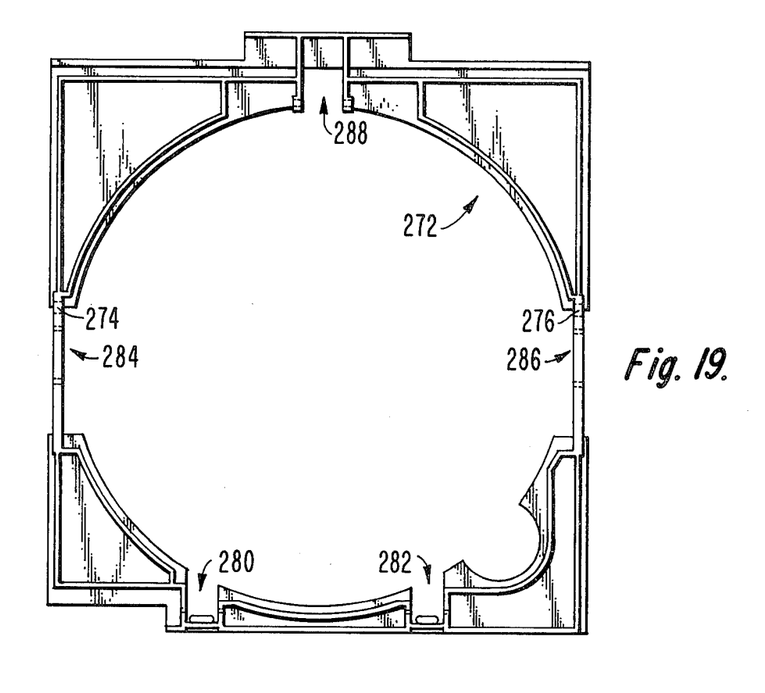
FIG. 19 shows a bottom view of a moveable platform suitable for use with the modified video disc system of FIG. 12.

A platform 272, the bottom view of which is shown in FIG. 19, is mounted in the modified player 230, for motion between an elevated position and a depressed position. The platform 272 has holes 274 and 276 for receiving pins (e.g., a pin 278 in FIG. 17) secured to the linkage assembly levers (for example, the lever 248 in FIG. 17).

From FIG. 12, it will be seen that the insertion of the record cover 260 into the input slot 262 of the player 230 causes the flapper door 232 to open which, in turn, causes the platform 272 to rise to the elevated position. In a similar manner, the withdrawal of the record cover 260 from the player 230 causes the platform to move to the depressed position, which, in turn, causes the flapper door 232 to close.

The configuration of the platform lifting/lowering mechanism of FIG. 12 is such that the motion of the platform from the depressed position to the elevated position takes place in two stages. In the first stage, the platform is pivoted about its distal end, and in the second stage, the platform is pivoted about its adjacent end, as the linkage assembly pins (e.g., the pin 278) are raised in response to cover insertion. In a similar fashion, the lowering of the platform also occurs in two stages.

An advantage of the platform lifting/lowering mechanism of FIG. 12, which causes a teeter-totter movement of the platform, is that for a given turntable diameter and for a given height through which the platform must be raised, the fore-and-aft dimension of the platform is relatively reduced, for example, in comparison with the platform lifting/lowering arrangement of FIGS. 7–9.

Figure 20:
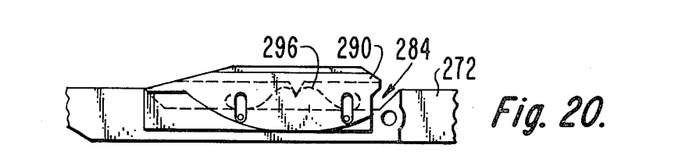
FIGS. 20 and 21, respectively, illustrate the end view and the plan view of a left-center lifting pad assembly mounted on the platform of FIG. 19 in accordance with the principles of the present invention.
Figure 21:
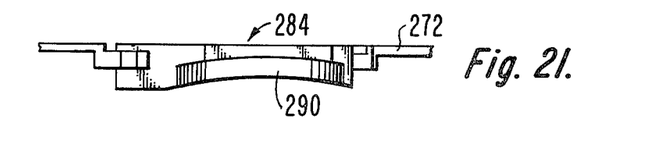
Figure 22:
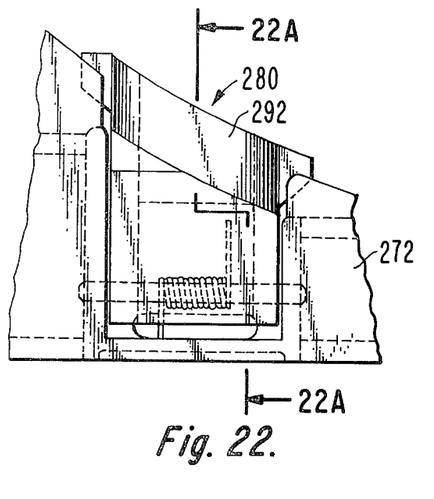
FIGS. 22 and 22a illustrate, respectively, the plan view and the end view of a left-front lifting pad mounted on the platform of FIG. 19 pursuant to this invention.
Figure 22A:
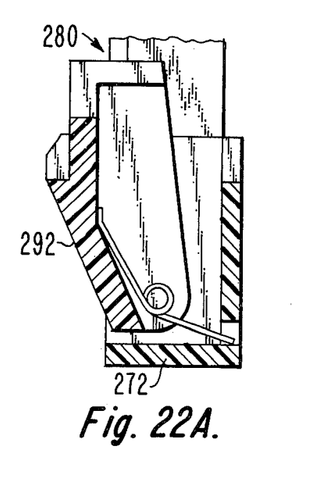
Figure 23:
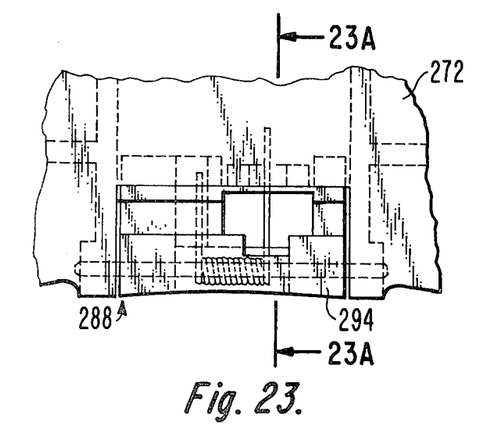
FIGS. 23 and 23a show, respectively, the plan view and the end view of a rear lifting pad mounted on the platform of FIG. 19 pursuant to this invention.
Figure 23A:
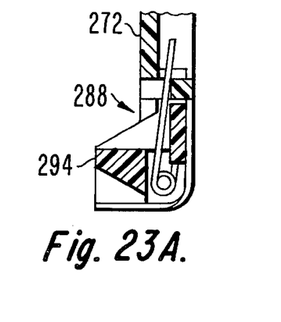

A set of five lifting pads — front-left pad, front-right pad, left-center pad, right-center pad and rear pad — are retractably mounted on the platform, respectively, at positions 280, 282, 284, 286 and 288. FIGS. 20 and 21, respectively, show the side view and the plan view of a left-center pad 290. Illustrated in FIGS. 22 and 22a is a front-left pad 292 and a rear pad 294 is shown in FIGS. 23 and 23a.

The lifting pads, while in retracted conditions, allow cover arrival at a fully inserted position in the player. The lifting pads, while in deployed conditions, support a retained record such that, when the platform is occupying the raised position, the record is aligned with an empty cover being inserted into the player through the input slot to facilitate the return of the retained record into the cover.

The lifting pads are caused to move to the retracted condition during cover arrival at the fully inserted position in the player. Biasing means (e.g., a wire spring 296 in FIG. 20) are provided to urge the lifting pads to return to the deployed condition.

Figure 24:
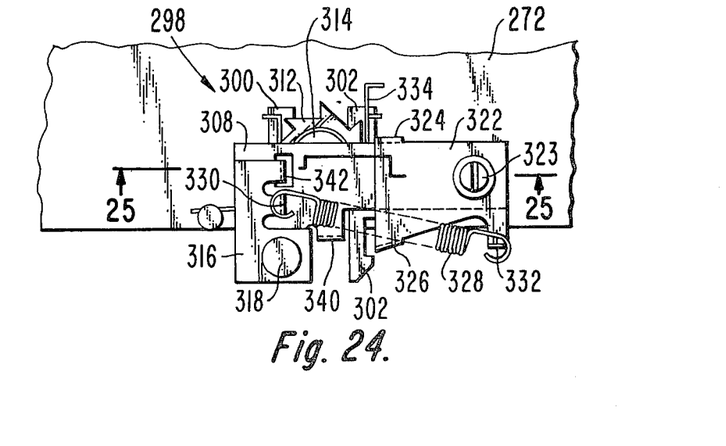
FIG. 24 illustrates a modified record extracting mechanism suitable for use in the video disc system of FIGS. 7 and 12.
Figure 25:
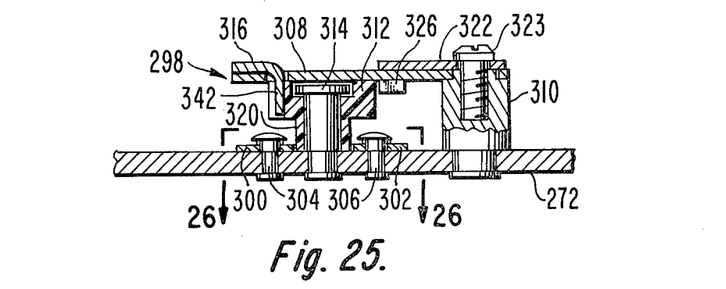
FIG. 25 is a sectional view of the modified record extracting mechanism along the line 25—25 in FIG. 24.
Figure 26:
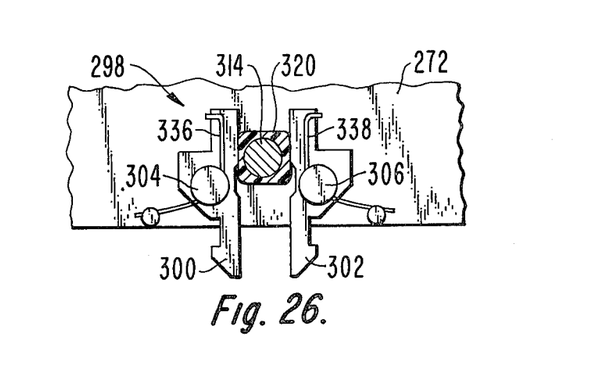
FIG. 26 is a sectional view of the modified record extracting mechanism along the line 26—26 in FIG. 25.

A modified record extracting mechanism 298 will now be explained in light of the FIGS. 24-26. FIG. 24 is a plan view of the modified record extracting mechanism 298. Shown in FIG. 25 is a sectional view of the record extracting mechanism 298 along the line 25—25 in FIG. 24. FIG. 26 illustrates a sectional view of the record extracting mechanism 298 along the line 26—26 in FIG. 25. The modified record extracting mechanism 298 is mounted on the platform 272 of the video disc player 230 shown in FIG. 12. While the use of the modified record extracting mechanism is explained in the context of the video disc player 230 of FIG. 12, it must be noted that it is also suitable for use in the video disc player 136 of FIGS. 7-9.

As shown in FIG. 26, the modified record extracting mechanism 298 includes a pair of latch arms 300 and 302 pivoted around the pins 304 and 306. The latch arms 300 and 302 are aligned with the center line of the guide rails (e.g., the guide rail 18) when the platform 272 is disposed in the elevated position.

A paddle arm 308 is pivotally mounted to the platform 272 by a pin 310 (FIG. 25). The clockwise rotation of the paddle arm 308 causes an indexing wheel 312, rotatably mounted on the platform 272 by a pin 314, to advance by one tooth, also in a clockwise direction, via a tang 342 of an actuating arm 316 pivotally secured to the paddle arm by a pin 318. Such a rotation of the indexing wheel 312 causes a square-shaped cam 320, disposed between the latch arm 300 and 302 secured to the indexing wheel, to advance by one step (e.g., 45°) in a clockwise direction. Such advancement of the square-shaped cam 320 causes the latch arms to alternate between an extended condition and a retracted condition.

A plate member 322 is fixedly secured to the platform 272 by a bolt 323. The plate member 322 has extensions 324 and 326 for restricting the arcuate motion of the paddle arm 308. A spring 328 is interconnected between a projection 330 of the actuating arm 316 and a projection 332 of the fixedly mounted plate member 322 to bias the actuating arm and the paddle arm 308 to return to their home positions. The record extracting mechanism 298 includes a pawl 334 (FIG. 24) for preventing a reversal of the motion of the indexing wheel 312 during return motion of the paddle arm 308. Wire springs 336 and 338 (FIG. 26) are provided to bias the latch arms 300 and 302 in continuous engagement with the cam 320.

The paddle arm 308 has an element 340 (FIG. 24) which engages the front portion of a record cover during its arrival at a fully inserted position in the player to cause a clockwise movement of the paddle arm.

The operation of the modified video disc player described with the help of FIGS. 12-26 is similar to the operation of the video disc player of FIGS. 7-9.

What is claimed is:

1. In a player for recovering prerecorded signals from a disc record removably subject to occupancy of a protective cover; said player including a housing having an input slot dimensioned to permit an insertion of a cover into said player and its removal therefrom; means aligned with said input slot for guiding said cover insertion and removal; a turntable rotatably mounted in said housing for supporting a record during playback; a platform mounted in said housing and disposed under said guide means for motion between an elevated position and a depressed position; means mounted in said player for protruding into a cover during arrival thereof at a fully inserted position in said player; said protruding means being subject to operation in a first condition and a second condition; said protruding means, while disposed in said first condition, permitting cover arrival at said fully inserted position; said protruding means, while disposed in said second condition, precluding a removal from said player of a record during a cover withdrawal from said fully inserted position after an occupied cover arrival, whereby a record is retained in said player resting on said platform upon conclusion of said cover withdrawal; means for causing motion of said platform to said depressed position to effect a transfer of said retained record from said platform to said turntable; and means responsive to cover arrival at said fully inserted position in said player for alternating the condition of said protruding means between said first condition and said second condition; the improvement comprising:

record supporting means adapted for motion between a retracted condition and a depolyed condition;
 said record supporting means being secured to said platform;
 said record supporting means in said retracted condition allowing cover arrival at said fully inserted position in said player; and
 said record supporting means in said deployed condition supporting a retained record such that, while said platform is disposed in said elevated position, said record is aligned with a cover resting on said guide means.

2. A player as defined in claim 1 wherein said record supporting means is caused to move from said deployed condition to said retracted position in response to cover arrival at said fully inserted position.

3. A player as defined in claim 1 further including means for biasing said record supporting means to occupy said deployed condition.

4. In a player for recovering pre-recorded signals from a disc record removably subject to occupancy of a protective cover comprising a jacket and a record retaining member removably located within said jacket; said player including a housing having an input slot dimensioned to permit an insertion of a cover into said player and its removal therefrom; means aligned with said input slot for guiding said cover insertion and removal; a turntable rotatably mounted in said housing for supporting a record during playback; a platform mounted in said housing and disposed under said guide means for motion between an elevated position and a depressed position; means mounted in said player for engaging the record retaining member during cover arrival at a fully inserted position in said player; said engaging means being subject to operation in a first condition and a second condition; said engaging means, while disposed in said first condition, permitting cover arrival at said fully inserted position; said engaging means, while disposed in said second condition, precluding a removal from said player of a record retaining member during a jacket withdrawal from said fully inserted position, whereby jacket withdrawal subsequent to an occupied cover arrival at said fully inserted position results in retention of the occupying record in said player; said record retaining member being constructed such that said retained record is permitted to rest on said platform disposed in said elevated position upon conclusion of said jacket withdrawal; means for causing motion of said platform from said elevated position to said depressed position to effect a transfer of said retained record from said platform to said turntable; and means responsive to cover arrival at said fully inserted position in said player for alternating the condition of said engaging means between said first condition and said second condition; the improvement comprising:

record supporting means adapted for motion between a retracted position and a deployed position;

said record supporting means being secured to said platform;

said record supporting means in said retracted position allowing cover arrival at said fully inserted position in said player; and     said record supporting means in said deployed position supporting a retained record such that, while said platform is disposed in said elevated position, said record is aligned with a cover resting on said guide means.

5. A player as defined in claim 4 wherein said record supporting means is caused to move from said deployed position to said retracted position in response to cover arrival at said fully inserted position.

6. A player as defined in claim 4 further comprising means for biasing said record supporting means to occupy said deployed position.

7. In a player for recovering prerecorded signals from a disc record removably subject to occupancy of a protective cover; said player including a housing having an input slot dimensioned to permit an insertion of a cover into said player and its removal therefrom; means aligned with said input slot for guiding said cover insertion and removal; and a platform mounted in said housing and disposed under said guide means for motion between an elevated position and a depressed position; the improvement comprising:

record supporting means secured to said platform, said record supporting means being subject to motion between a withdrawn position and a deployed position relative to said platform;

said record supporting means in said withdrawn position allowing cover arrival at a fully inserted position in said player; and     said record supporting means in said deployed position supporting a record such that, while said platform is disposed in said elevated position, said record is aligned with an empty cover when it is guided by said guide means.

8. A player as defined in claim 7 wherein said record supporting means is caused to move from said deployed position to said withdrawn position in response to cover arrival at said fully inserted position.

9. A player as defined in claim 7 further including means for biasing said record supporting means to occupy said deployed position.